(12) United States Patent
Fugman et al.

(10) Patent No.: US 6,478,499 B1
(45) Date of Patent: Nov. 12, 2002

(54) ADJUSTABLE CORNER FITTING

(75) Inventors: Kurt J. Fugman, Lockport; James L. Walke, Rockdale, both of IL (US)

(73) Assignee: Panduit Corp., Tinley Park, IL (US)

( * ) Notice: Subject to any disclaimer, the term of this patent is extended or adjusted under 35 U.S.C. 154(b) by 48 days.

(21) Appl. No.: 09/631,471

(22) Filed: Aug. 3, 2000

(51) Int. Cl.⁷ .............................................. H02G 3/06
(52) U.S. Cl. .......................... 403/82; 403/84; 403/403; 285/145.2
(58) Field of Search ............................. 403/82, 403, 83, 403/84; 285/145.2, 184, 181, 182

(56) References Cited

U.S. PATENT DOCUMENTS

| | | |
|---|---|---|
| 1,727,772 A | 9/1929 | Hotchkin |
| 4,661,007 A | 4/1987 | Schneider |
| 4,666,328 A | 5/1987 | Ryu |
| 4,779,901 A * | 10/1988 | Halling .................... 285/184 |
| 5,211,602 A | 5/1993 | Holmgren |
| 5,375,891 A | 12/1994 | Sicotte et al. |
| 5,470,021 A * | 11/1995 | Looney .................... 248/49 |
| 5,621,994 A | 4/1997 | Cobb et al. |
| 6,002,087 A | 12/1999 | Albert et al. |

FOREIGN PATENT DOCUMENTS

| | | | |
|---|---|---|---|
| EP | 0 578 459 | * | 1/1994 |
| EP | 0 881 160 | * | 5/1997 |
| FR | 2608-726 A | | 6/1988 |
| JP | 6-66395 A | | 8/1994 |
| JP | 10-14050 | * | 8/1996 |

* cited by examiner

Primary Examiner—Lynne H. Browne
Assistant Examiner—John R. Cottingham
(74) Attorney, Agent, or Firm—Robert A. McCann; Jay A. Saltzman; Christopher S. Clancy

(57) ABSTRACT

An adjustable corner fitting suitable for use with a cable raceway duct system includes first and second interconnectable arcuate base members and first and second interconnectable covers. One of the base members has at least one arcuate slot and the other of the base members has at least one boss positionable within the at least one slot. The arcuate slot has a curvature and a length that constrains the boss within the slot and allows pivoting of the first base member relative to the second base member about a pivot point within a predetermined range of relative angular movement when the first and second interconnectable arcuate base members are mated. One of the covers has at least one slot and the other has at least one latch positionable within the slot of the one cover. The first and second arcuate covers are interconnectable with each other allowing relative pivotal movement therebetween and interconnectable with the first and second interconnectable arcuate base members to form an adjustable corner fitting that mates with a raceway duct section. The corner fitting can be positioned at one of several angular configurations within a range of angular movement defined by the slot and boss of the base members. A filler may be provided to fill any gap that exists due to movement of the adjustable corner fitting to extremes of the movement range. Overlapping longitudinally extending divider walls may be provided within the corner fitting to define a plurality of channels that can be used to route cabling. The fitting may form either an outside corner fitting or an inside corner fitting and allows for quick and easy customizable placement within building walls or provided as a surface mount system to route, protect and conceal data, voice, video, fiber-optic and/or power cabling.

18 Claims, 13 Drawing Sheets

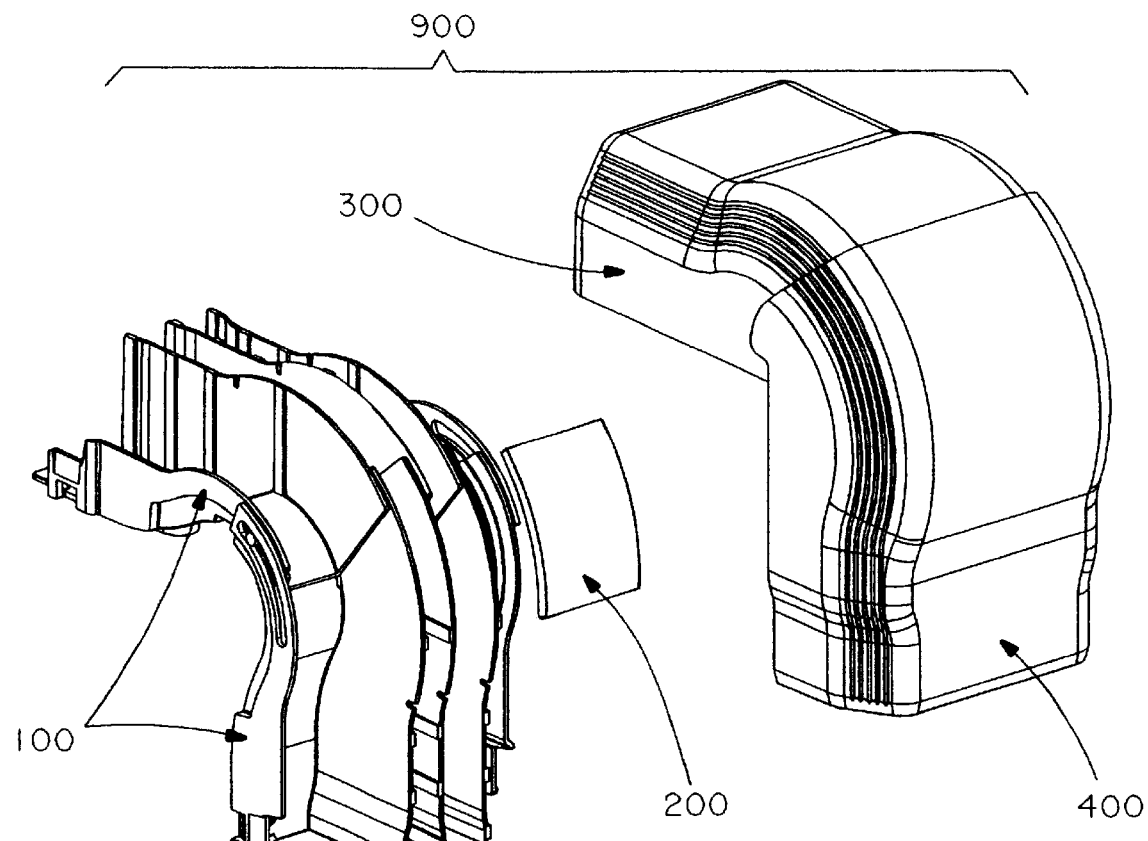
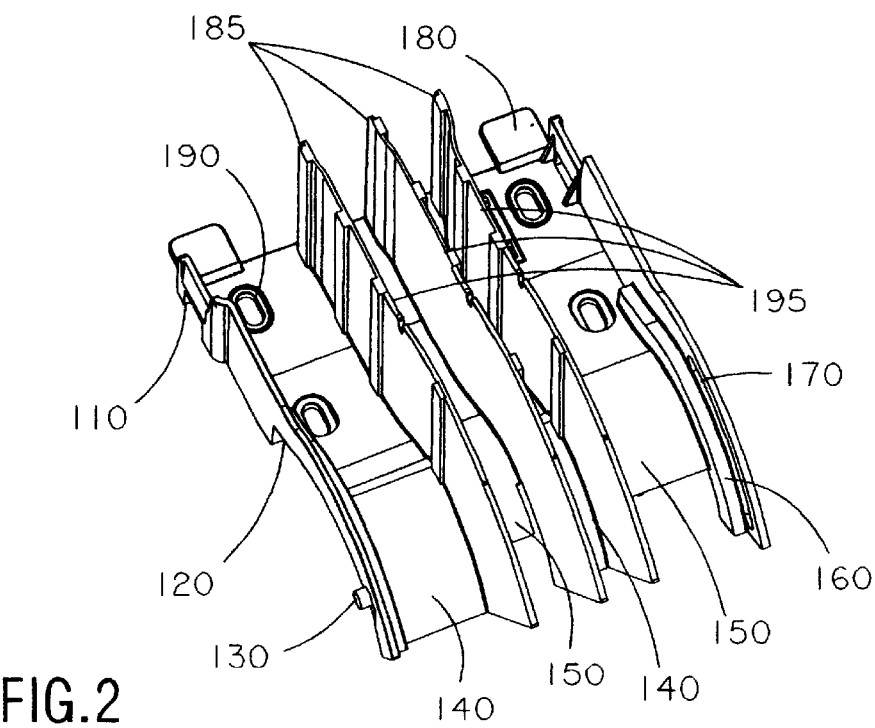

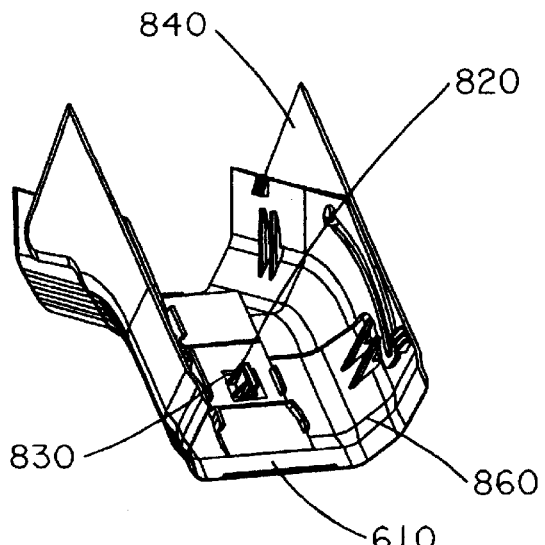
FIG.22
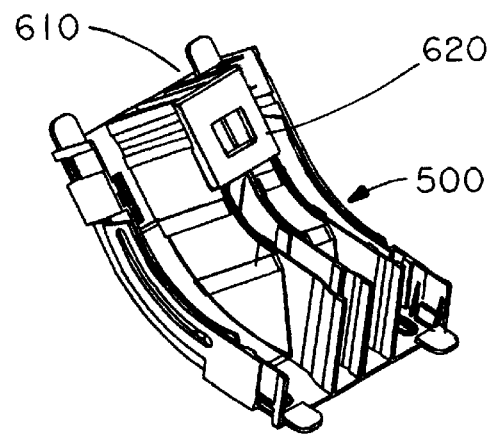
FIG.23
FIG.24
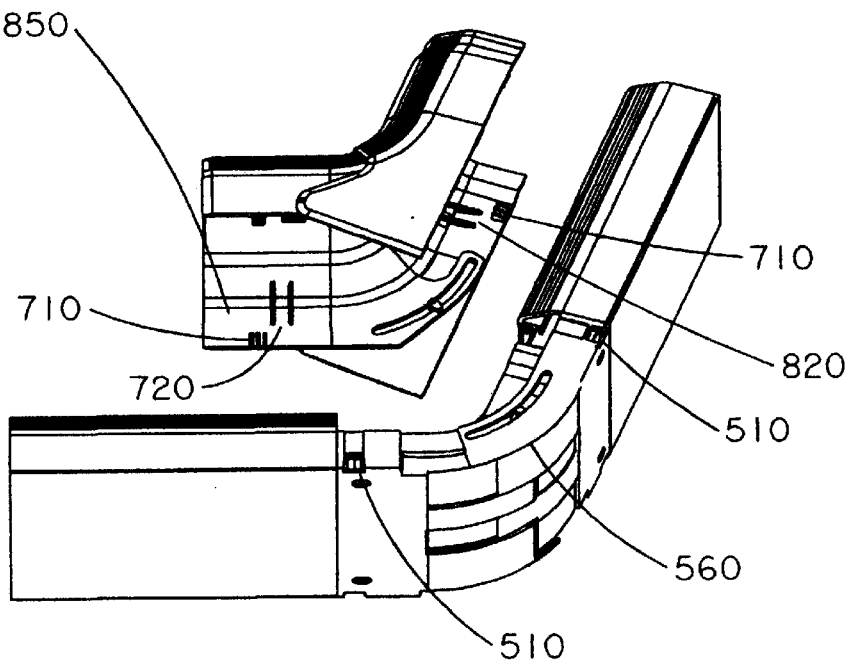

ADJUSTABLE CORNER FITTING

BACKGROUND OF THE INVENTION

1. Field of Invention

The invention relates to an adjustable corner fitting for a raceway or duct cable system that can readily be configured for a particular angle. The fitting may serve as either an inside corner fitting or an outside corner fitting.

2. Description of Related Art

Raceway and duct systems have become very popular in recent years to route, protect and conceal data, voice, video, fiber-optic and/or power cabling. Such systems allow custom installation and can be provided within walls or more preferably provided on external surfaces, allowing ready access for reconfiguration, repair, or installation of additional equipment. Such systems have conventionally been provided with various sections of duct or raceway, including straight sections, 90 degree corner fittings, 45 degree corner fittings, T fittings, four-way intersections (X) fittings, and the like, which are affixed together by way of a duct coupler.

With these various sections and fittings, a cable duct or raceway system can be assembled that meets most needs. However, there are certain installations that require an unusual angle and existing preformed sections cannot readily accommodate such demands. Moreover, in the field, it may be necessary to bring a large number of fittings and section types to the job site to be able to meet demands of the particular job. This is particularly true if an installer does not readily know the layout of the particular building being wired. As such, excess inventory and supplies may need to be carried. However, even then, special circumstances may arise that require a fitting that cannot be achieved with such conventional fixed fittings.

SUMMARY OF THE INVENTION

While commercial duct and raceway systems exist, there is a need for such a system to be more easily configured in the field.

There also is a need for an improved corner fitting that can be readily configured to one of several possible angles to allow for custom installation, such as along two adjoining walls, without requiring a large number of specialty corner fittings.

There also is a need for such an improved corner fitting to be able to maintain minimum bend radius control.

There further is a need for such a corner fitting that can maintain separation of channels around the bend of the fitting.

The invention has been made to satisfy the above needs and objects and provides a cable raceway duct fitting for a cable duct system. The system includes an adjustable corner fitting for a raceway duct system including first and second interconnectable arcuate base members and first and second interconnectable covers. One of the base members has at least one arcuate slot and the other of the base members has at least one boss positionable within the at least one slot. The arcuate slot has a curvature and a length that constrains the boss within the slot and allows pivoting of the first base member relative to the second base member about a pivot point within a predetermined range of relative angular movement when the first and second interconnectable arcuate base members are mated. One of the covers has at least one slot and the other has at least one latch positionable within the slot of the one cover. The first and second arcuate covers are interconnectable with each other allowing relative pivotal movement therebetween and interconnectable with the first and second interconnectable arcuate base members to form an adjustable corner fitting that mates with a raceway duct section. The corner fitting can be positioned at one of several angular configurations within a range of angular movement defined by the slot and boss of the base members. A filler may be provided to fill any gap that exists due to movement of the adjustable corner fitting to extremes of the movement range.

The invention may be used as either an outside corner fitting or an inside corner fitting and allows for quick and easy customizable placement within building walls or provided as a surface mount system to route, protect and conceal data, voice, video, fiber-optic and/or power cabling.

BRIEF DESCRIPTION OF THE DRAWINGS

The foregoing and further objects, features and advantages of the present invention will become apparent from the following description of preferred embodiments with reference to the accompanying drawings, wherein:

FIG. 1 is an exploded perspective view of an exemplary outside corner fitting according to the invention;

FIG. 2 is a perspective view of a base member according to the invention;

FIGS. 22–23 show identification of a gap that is filled by a filler positioned on the covers;

FIG. 24 shows assembly of the assembled covers onto the assembled base members according to the invention;

DETAILED DESCRIPTION OF PREFERRED EMBODIMENTS

Figure 3:
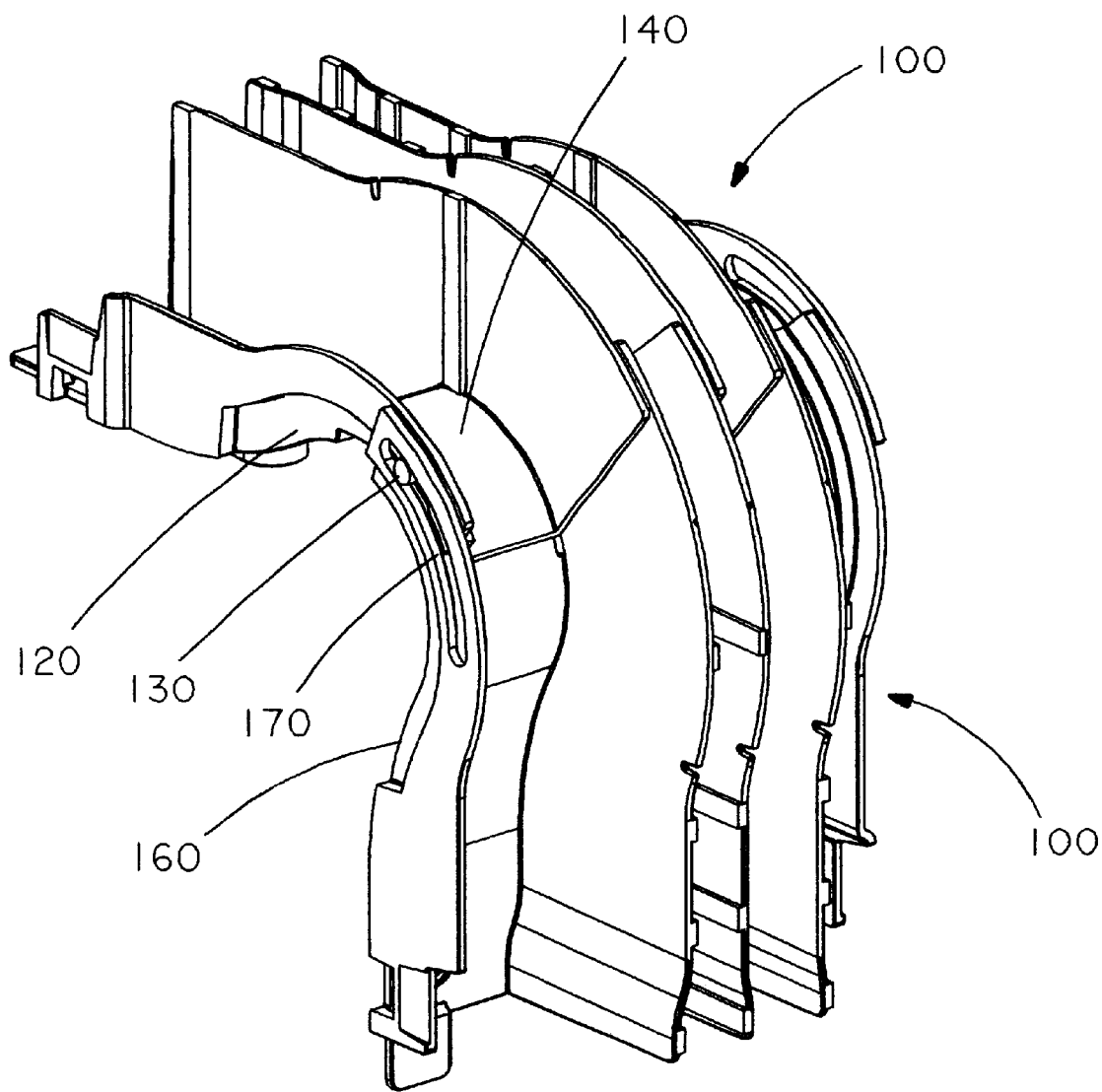
FIG. 3 is a perspective view of two base members joined together according to the invention.

FIG. 1 illustrates components of an adjustable corner fitting 900 according to the invention. This particular fitting is an outside corner fitting. However, the invention is not limited to this and is adaptable to inside fittings, embodiments of which will be described in detail later. The adjustable corner fitting 900 includes two interconnectable and relatively rotatable arcuate base members 100 and two interconnectable and relatively rotatable covers 300, 400. The base members 100 mate to allow limited pivotal movement. The base members may include a filler 200 that fills a cover gap caused by certain rotation of covers 300 and 400. One of the covers is preferably fixed with the other being pivotable relative to the fixed cover. However, both covers could be relatively rotatable to the other. The covers 300, 400 once assembled together mate with the assembled base members 100 to form an adjustable corner fitting that defines at least one longitudinally extending channel that can receive cabling. Overlapping divider walls are preferably provided to provide and maintain a separation of channels.

The base members will be described in further detail with reference to FIG. 2. Base members 100 are provided with pockets 110 that accept latches 310 or 410 from one of the associated covers 300, 400. Pocket 120 is a recessed pocket that accepts pocket 160. Pocket 120 allows pocket 160 to slide therealong when the base is rotated to an appropriate angle. Boss 130 moves within slot 170. Tabs 140 and divider walls 185 are provided that move inside of tabs 150 when the base is rotated. The divider walls 185 correspond to divider walls provided on raceway duct sections, but are preferably slightly offset going through the fitting. As a result, the divider walls 185 will slide against each other and the tabs 140 will slide against tabs 150. The divider walls 185 subdivide the interior of the corner fitting into a plurality of longitudinally extending channels that are isolated from each other. Moreover, by providing overlapping divider walls 185, separation of channels can be maintained at any angle within an allowable range. As such, cables can be routed through individual ones of the channels and kept separated from other cables. For example, power cables can be routed in one channel and data cables, such as fiber optic cables, routed through another channel. Tabs 180 line the fitting to the ends of the raceway (unshown) to which the corner fitting is attached. Screw holes 190 are provided for fastening base 100 to a wall. Notches 195 are provided for use as a guide for cutting filler 200 and to position it on base 100.

FIG. 3 shows two base members 100 joined together. The unshown side includes the same structure as the visible side and operates the same. That is, each base 100 includes a boss 130 on one side and slot 170 on the other side so that when assembled the boss 130 from one base fits within the slot 170 from the other base. Pockets 120 accepts pocket 160. As the base members are rotated, pockets 160 slide inside pockets 120. Tabs 140 from one base slide on top of tab 150 from the other base and vice versa. These two actions allow pivoting of the base members 100 about a pivot point. Movement of the two base members 100 is constrained within a defined range of motion by bosses 130, which slide inside slots 170.

Figure 4C:
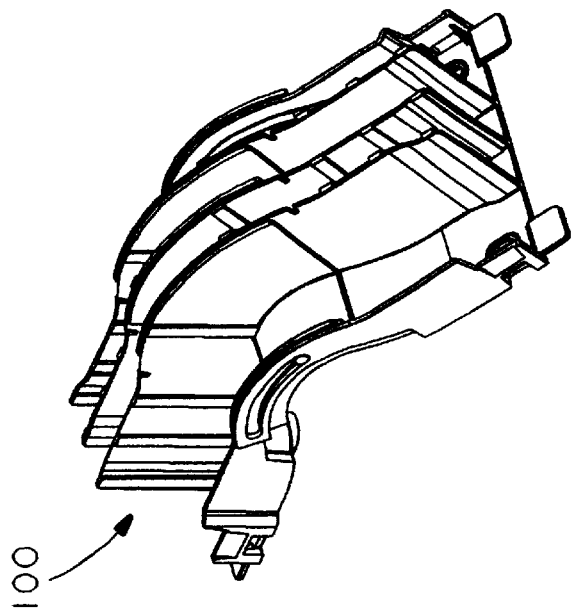
FIGS. 4A–C show assembled base members of the inventive outside corner fitting at various ranges of pivotal motion.
Figure 4B:
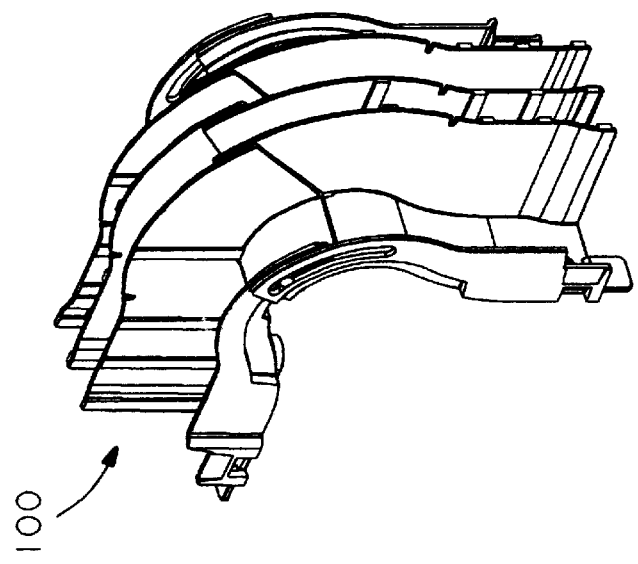
Figure 4A:
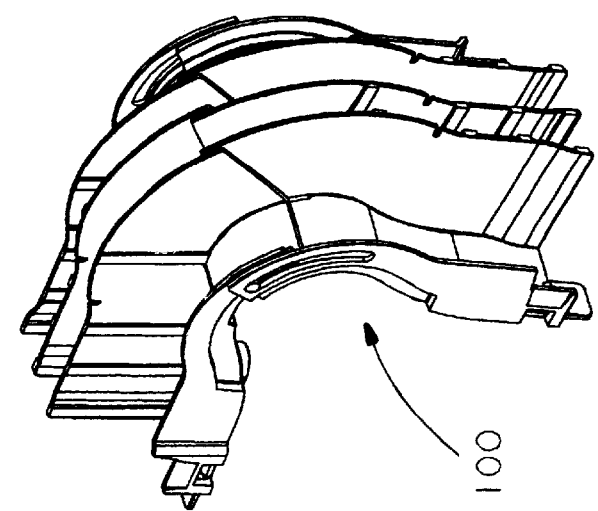
Figure 5:
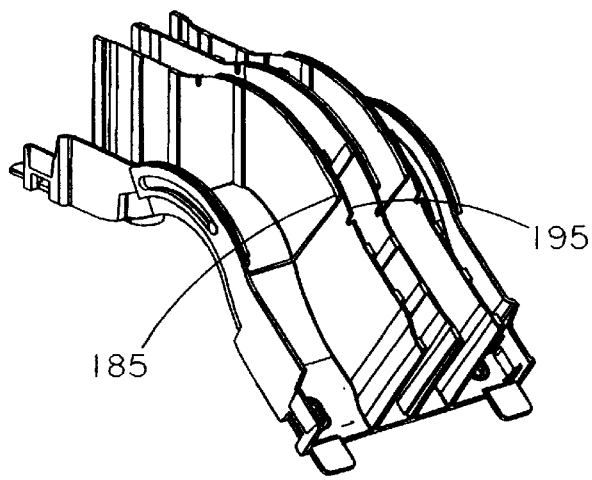
FIGS. 5–6 show identification of a gap and positioning of a filler element onto the assembled base members to fill the gap.
Figure 6:
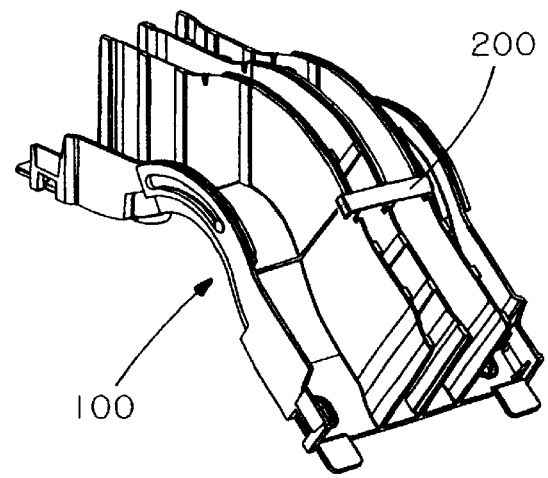

FIGS. 4A–C show illustrations of the base members over an extreme range of motion, including an extreme acute angle (FIG. 4A), a moderate 90° angle (FIG. 4B), and an extreme obtuse angle (FIG. 4C). As shown, the base 100 maintains separation of channels throughout the full range of movement. However, due to the rotation of covers 300 and 400 at different angle inclinations, the covers may leave a gap that is greater than an allowable gap. In such a situation, filler 200 may be provided to fill the gap. The filler is preferably an elastic part that allows conformance with the curvature of the base. Notches 195 on the base and the beginning of the divider walls 185 on the opposite base define the length of filler 200. By positioning filler 200 against notches 195 and then laying the filler towards the other base, a knife, scissors or other cutting instrument can be used to cut filler 200 at a point where the other base's divider walls 185 begin, as shown in FIG. 5. FIG. 6 shows filler 200 attached to the base members 100.

Figure 7:
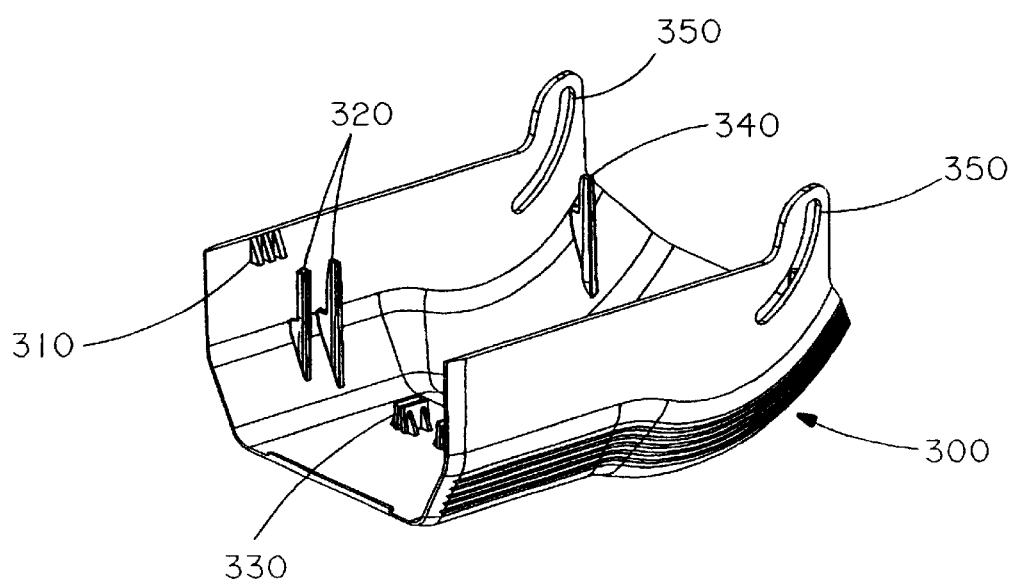
FIG. 7 is a perspective view of a fixed cover according to the invention.

FIG. 7 is an isometric view of fixed cover 300. Latches 310 attach to base 100 at pocket 110. Ribs 320 are provided to enclose the side walls of the base to reduce the amount of movement that latches 310 move away from the base when impacted. Latches 330 latch onto the divider wall of the base 100 to provide additional resistance that resists the cover from lifting off the base. Ribs 340 pull cover 300 to the base 100 when the covers are installed. Slot 350 is provided to retain latch 450 from cover 400. The range of slot 350 is the same as slot 170 on the base.

Figure 8:
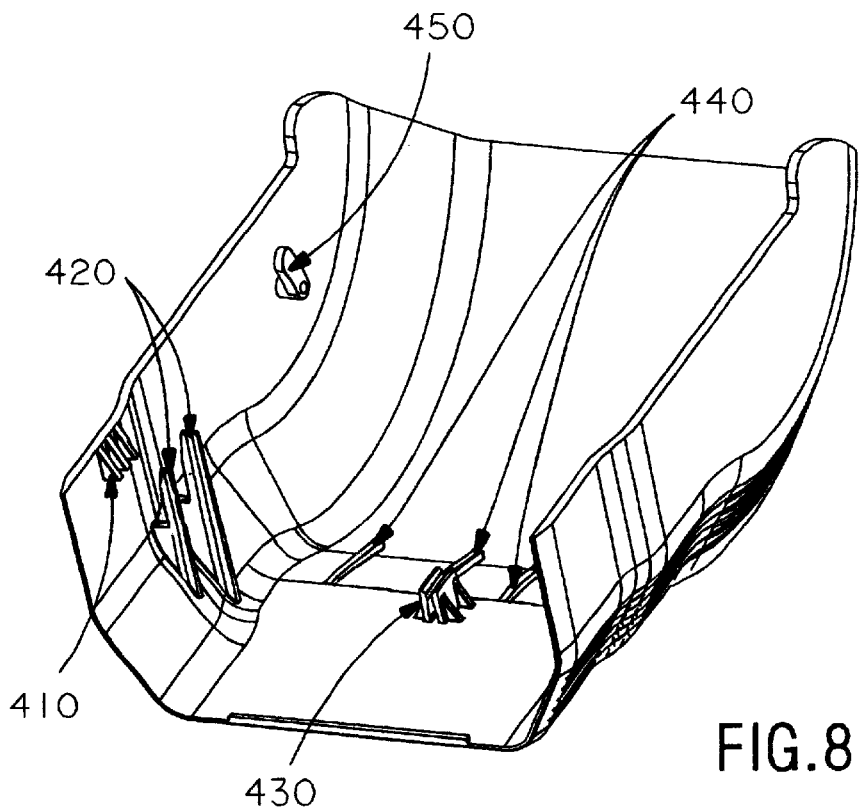
FIG. 8 is a perspective view of a pivoting cover according to the invention.

FIG. 8 is an isometric view of pivoting cover 400. Latches 410 attach to the base at pocket 110. Ribs 420 enclose the side walls of the base to reduce the amount of movement that latches 410 move away from the base when impacted. Latches 430 latch onto the divider wall 185 of the base 100 to provide additional resistance that resists the cover from lifting off the base. Ribs 440 align with the divider walls 185 on the base 100 to eliminate a gap, such that the cover passes regulatory standards. Latch 450 is provided to attach covers 300 and 400 together. When assembled, latch 450 moves inside of slot 350, allowing the covers 300, 400 to have the same amount of adjustment as the base members 100.

Figure 9:
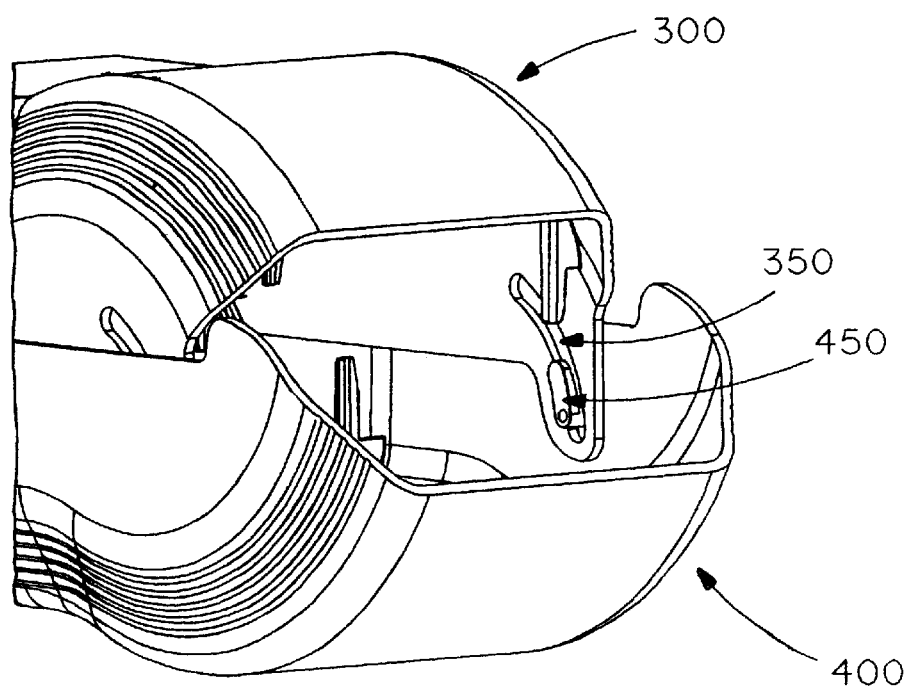
FIGS. 9–10 show attachment of the two covers together from two separate views.
Figure 10:
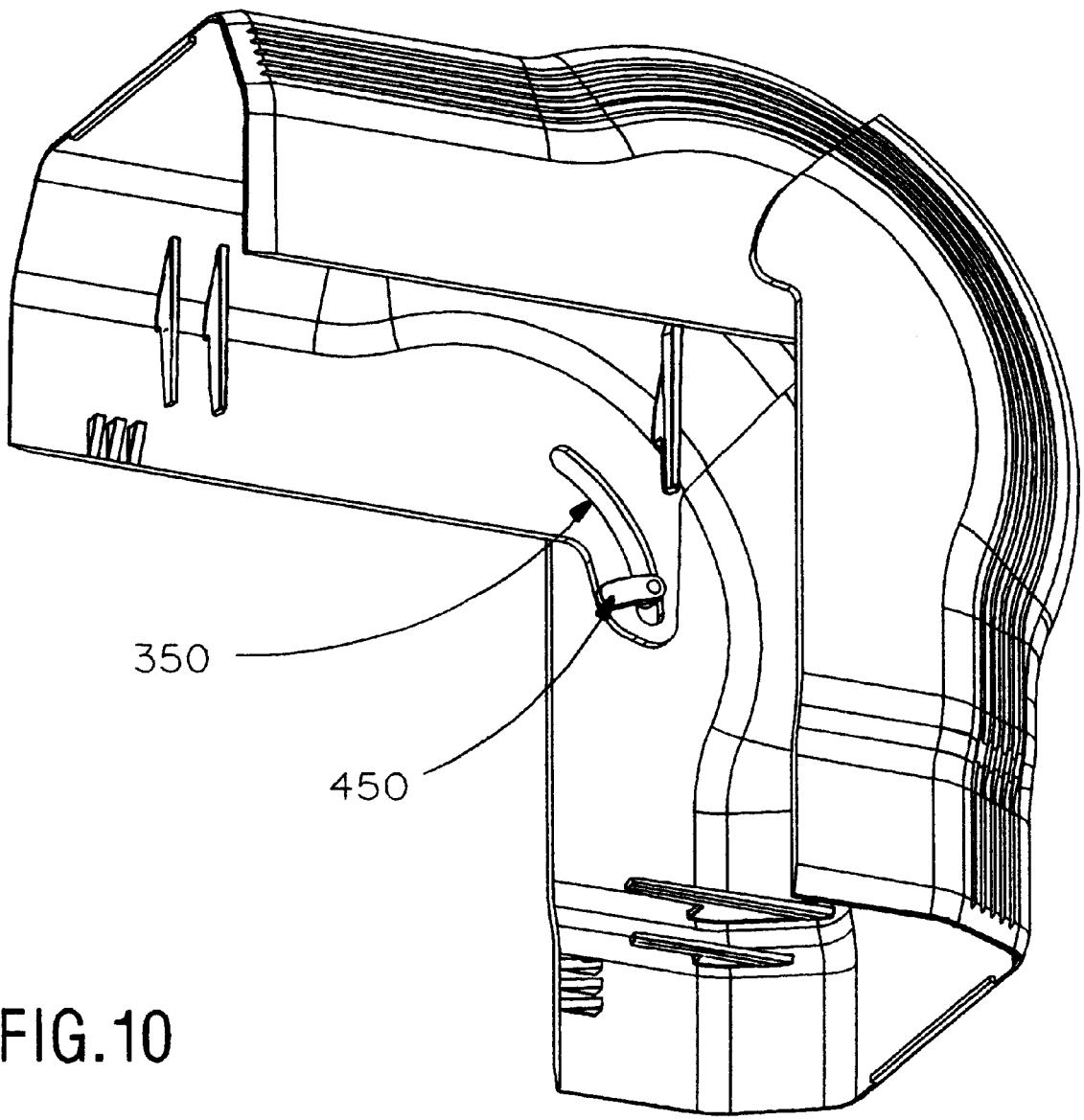

FIGS. 9–10 show attachment of the covers. Covers 300 and 400 are oriented in an appropriate position so that latch 450 can be inserted into slot 350 on both sides of cover 300 (FIG. 9). Once completed, the covers 300, 400 can be rotated to a suitable position, with the latches 450 on the inside of cover 300 holding the covers together (FIG. 10).

Figure 11:
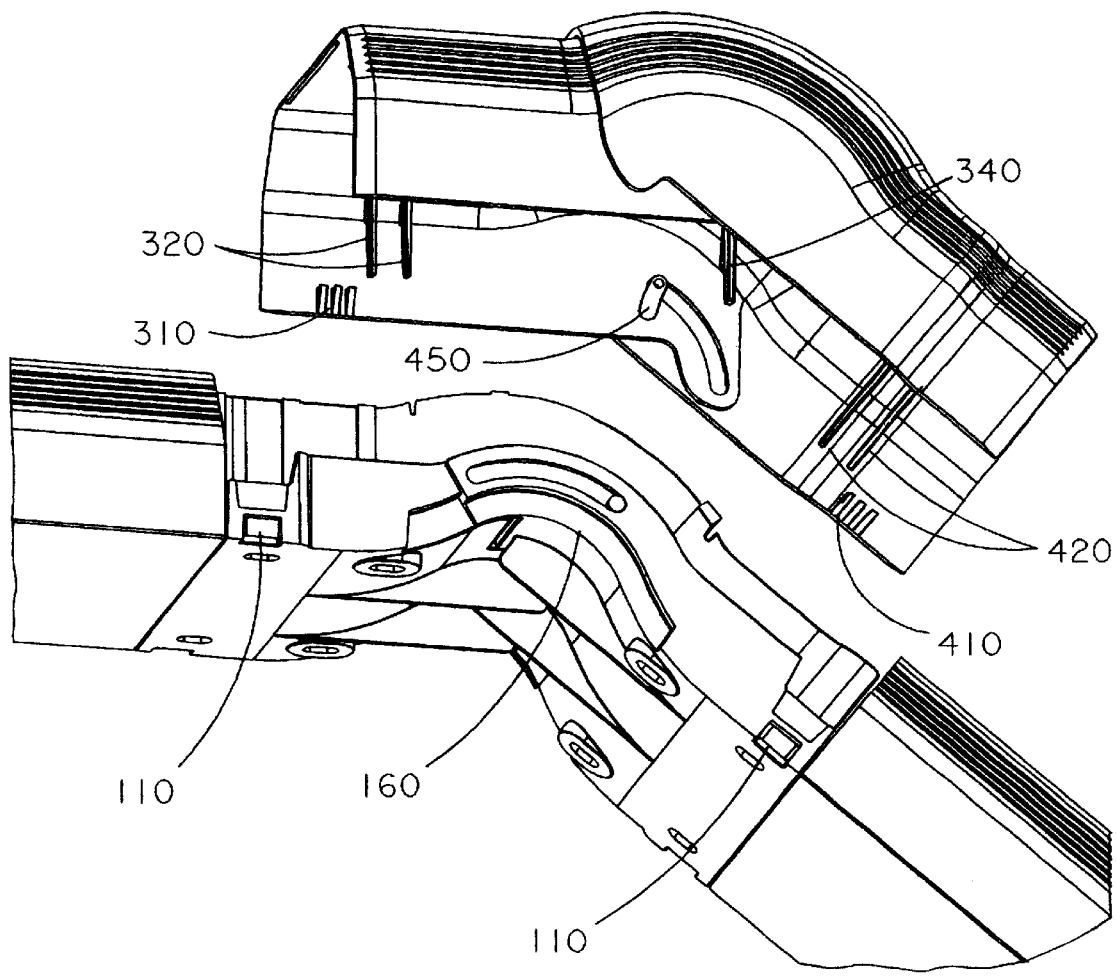
FIG. 11 shows assembly of the assembled covers onto the assembled base members according to the invention.

After installation of the covers 300, 400 together, the covers can be installed onto the base members 100. The base members and covers each have a same axis of rotation so that the covers connect to the base members regardless of orientation. FIG. 11 shows installation of the covers 300, 400 to the base 100. The covers slide down the base members simultaneously. Latches 310, 410 and 450 flex the covers 300, 400 away from the base members 100 as they are slid down. Ribs 320, 340 and 420 slide on the inside of the base's walls. This action pulls the covers into pockets 110. Also, this action pushes down latches 450 used to connect the two covers 300, 400 so that they fit into pocket 160 and becomes an additional latch to help retain the covers on the base members. Ribs 340 then pull the covers 300, 400 to the base 100 and help the covers from moving away from the base when impacted. As the covers become fully seated on the base members, latches 330 and 440 latch onto the divider walls 185 of the base members 100.

Figure 12:
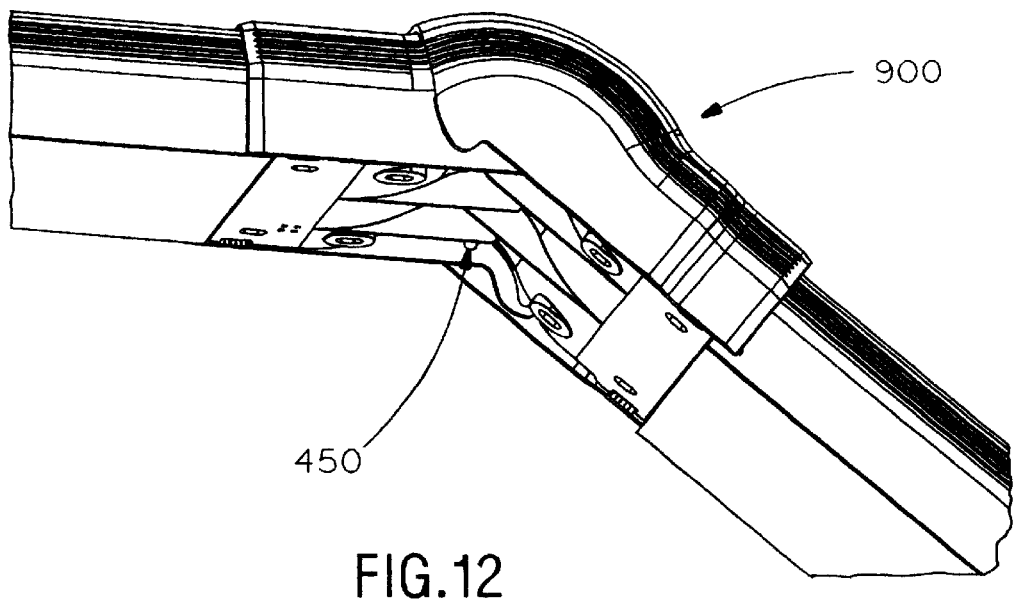
FIG. 12 shows an underside perspective view of the fully assembled adjustable outside corner fitting according to the invention.
Figure 13:
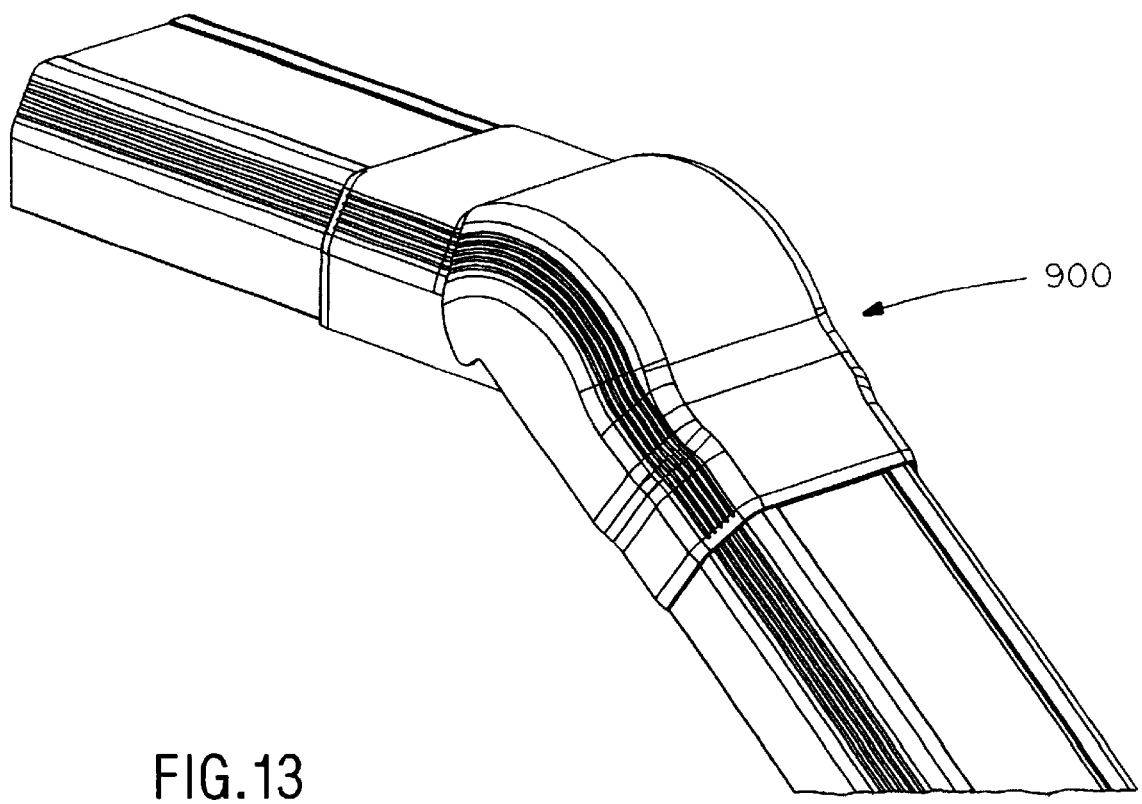
FIG. 13 shows a top side perspective view of the fully assembled adjustable outside corner fitting according to the invention.

FIG. 12 shows an underside of the outside corner fitting 900 completely assembled. Latch 450 is seated underneath the base as shown and acts as an additional latch. FIG. 13 shows another view of the outside corner fitting 900 completely assembled. The hump in the cover accommodates bend radius control in the base so there is no reduction in capacity for cables being routed through the fitting.

Figure 14:
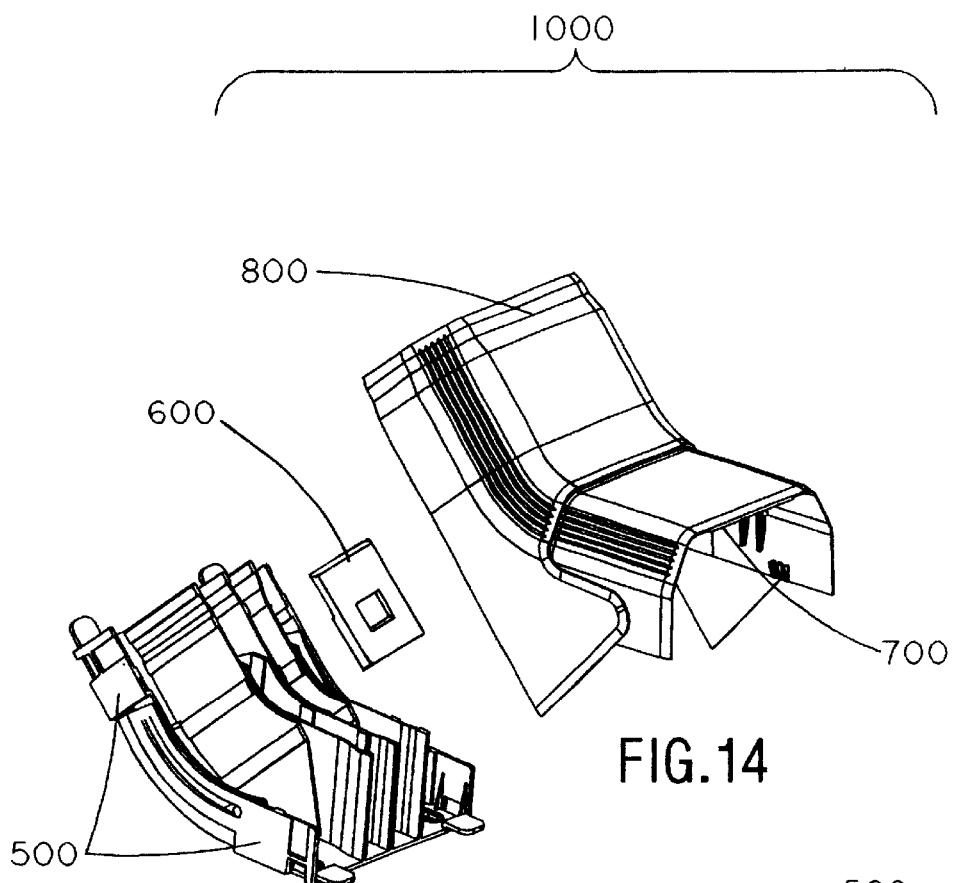
FIG. 14 is an exploded view of base and cover members of an adjustable inside corner fitting according to the invention.

A second embodiment of the invention will be described with reference to FIGS. 14–26. FIG. 14 illustrates the components of the inside corner fitting 1000, including two base members 500, filler 600, inside cover 700 and outside cover 800. The two base members 500 interlock with each other preferably allow the fitting to maintain a separation of channels. The base members also maintain a specified bend radius that is preferably 40 mm or greater (1.5"). Filler 600 is provided to fill a gap that is created between the outside cover 800 and the inside cover 700 when the outside cover 800 is rotated relative to the inside cover 700. The covers 700, 800 are movable relative to each other, with cover 700 preferably being a fixed cover and outside cover 800 being a pivoting cover. However, this order can be reversed or both can be made pivotal.

Figure 15:
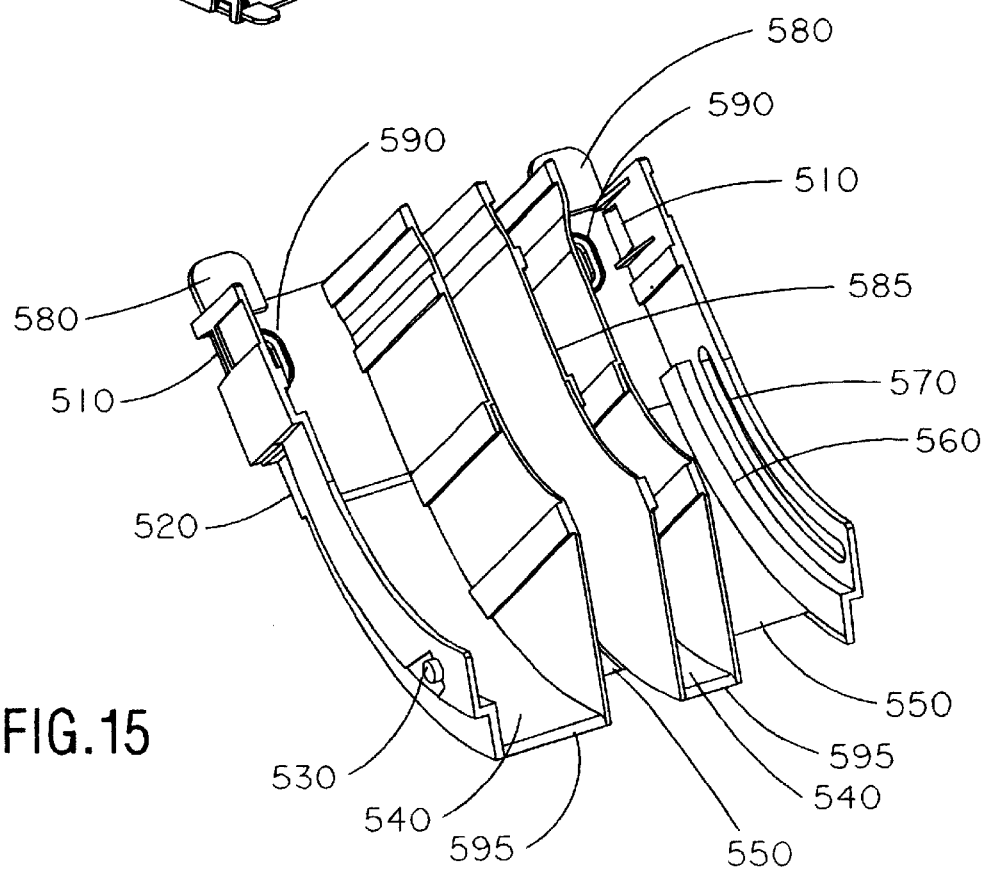
FIG. 15 is a perspective view of one of the base members for the inside corner fitting.

The base members will be described in further detail with reference to FIG. 15. Base members 500 are provided with pockets 510 that accept latches 710 or 810 from either of the covers 700, 800. Pocket 520 is a recessed pocket that accepts a projection 560. Pocket 520 allows projection 560 to slide along it when the base 100 is rotated to an appropriate angle. Likewise, boss 530 moves within a slot 570 when the base is rotated to the appropriate angle. Tabs 540 and divider walls 585 move inside of tabs 550 when the base is rotated. The divider walls 585 that line up to divider walls on the raceway section to which the fitting is attached are offset going through the fitting. As a result, the divider walls 585 will slide against each other and the tabs 540 will slide against tabs 550. This maintains the separation of channels at any angle within an allowable range.

Tabs 580 line up the fitting to the ends of a raceway section (not shown). Holes 590 are screw holes that are provided to fasten the base to a wall or other surface. Radii 595 are formed to eliminate sharp corners that could damage wires when the fitting is rotated to a maximum obtuse angle.

Figure 16:
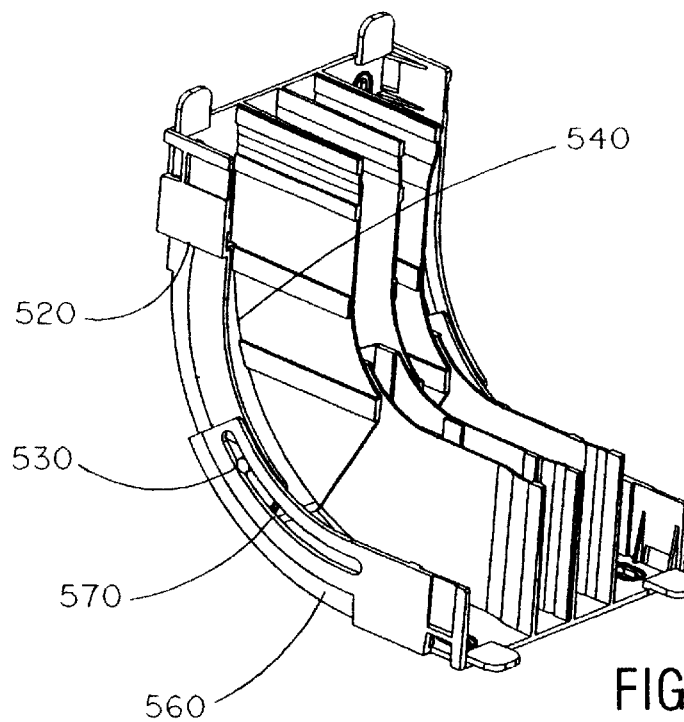
FIG. 16 is a perspective view of two base members joined together according to the invention.

FIG. 16 shows the two base members 500 joined together. The unshown side includes the same structure as the visible side and operates the same. Pocket 520 accepts projection 560. As the base members 500 are rotated, projection 560 will slide inside of pockets 520. Tabs 540 from one base 500 will slide on top of tabs 550 from the other base, and vice versa. At the same time, bosses 530 slide inside of slots 570. These actions pivot the base members 500 about a pivot point. The range of motion achieved by the base members is determined by the slots 570.

Figures 17A, 17B, 17C:
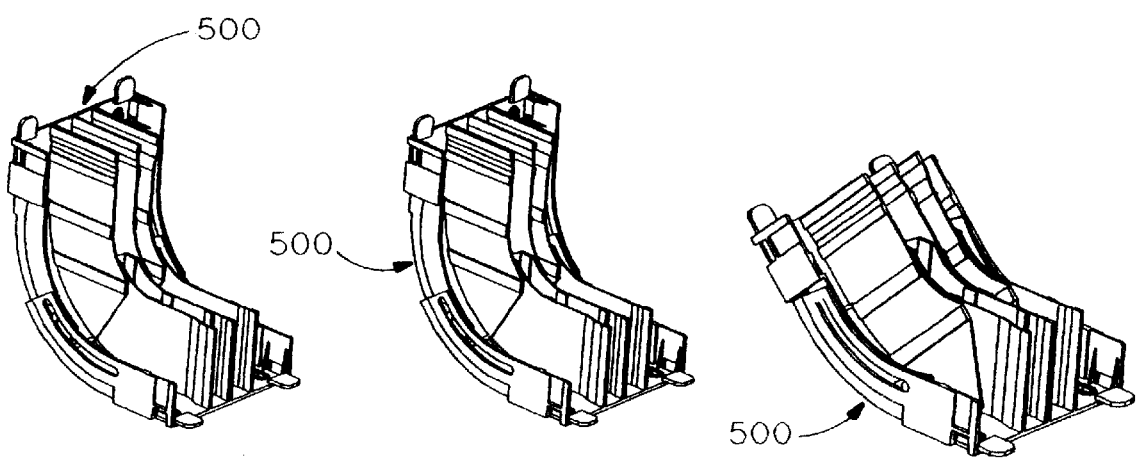
FIGS. 17A–C show assembled base members of the inventive inside corner fitting at various ranges of pivotal motion.

FIGS. 17A–C show illustrations of the base members over an extreme range of motion, including an extreme acute angle (FIG. 17A), a moderate 90° angle (FIG. 17B), and an extreme obtuse angle (FIG. 17C). As shown, the base 500 maintains separation of channels throughout the full range of movement.

Figure 18:
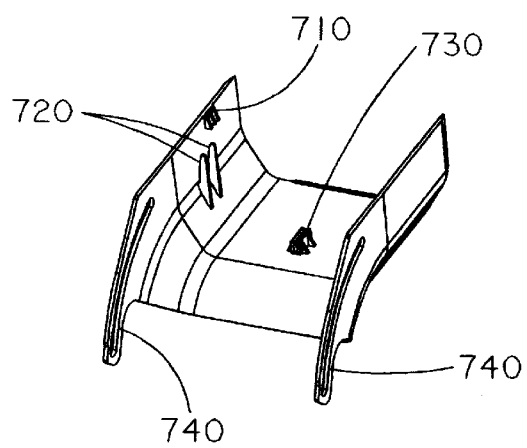
FIG. 18 is a perspective view of an inside cover according to the invention.

FIG. 18 is a perspective view of inside cover 700. Latches 710 attach to the base 500 at pocket 510. Ribs 720 enclose the side wall of the base to reduce the distance that latches 710 move away from base 500 when the base is impacted. Latches 730 latch onto the divider wall 585 of the base 500 to provide additional resistance, preventing the cover from lifting off the base. Slot 740 retains latch 850 from outside cover 800.

Figure 19:
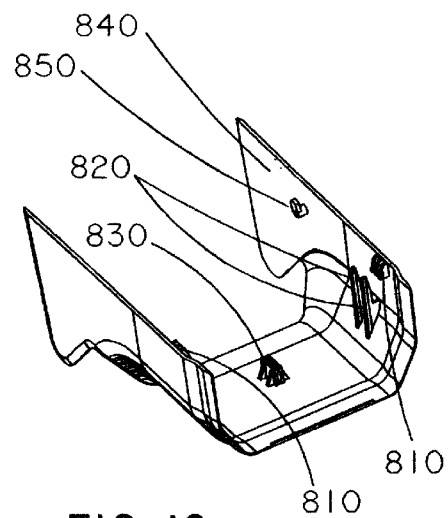
FIG. 19 is a perspective view of an outside cover according to the invention.

FIG. 19 is a perspective view of outside cover 800. Latches 810 attach to base 500 at pocket 510. Ribs 820 enclose the side wall of the base like ribs 720 to reduce the distance that latches 810 move away from base 500 when the base is impacted. Latches 830 attach onto the divider wall 585 of the base to provide additional resistance, preventing the cover 800 from lifting off of the base 500. Markings 840, such as score lines, can be provided to allow the user to rotate outside cover 800 to ensure that it makes certain predefined angles with inside cover 700. Latches 850 are used to attach covers 700, 800 together. When the covers 700, 800 are assembled, latch 850 moves inside of slot 740 allowing the covers to have the same amount of rotation as the base members.

Figure 20:
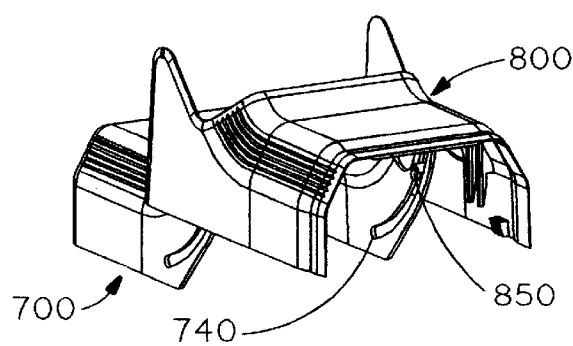
FIGS. 20–21 show attachment of the two covers together from two separate views.
Figure 21:
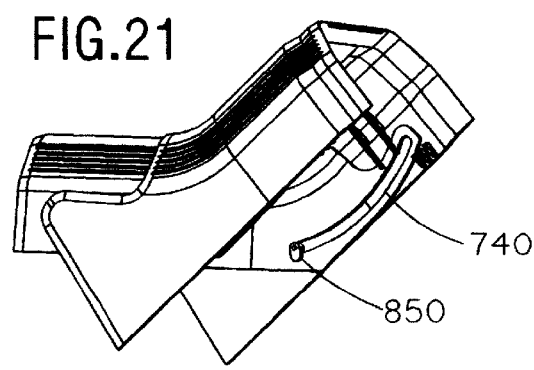

FIGS. 20–21 show attachment of the covers 700, 800. The covers are oriented in a position such that latch 850 can be inserted into slot 740 on both sides of cover 700 (see FIG. 20). Once this is done, the covers 700, 800 can be rotated to an appropriate position, in which latches 850 are on the inside of cover 700 holding the two covers together (FIG. 21).

Due to the rotation of covers 700, 800 at different angle inclinations, the covers may leave a gap between the base members' divider walls 585 and the cover that is greater than allowable. Additionally, outer cover 800 should fit snugly into the corner at different angles. In order to best fulfill these requirements, filler 600 and score lines 840 are provided. First, as shown in FIG. 22, the end user measures the angle between the mounting surface or wall where the base members 500 have been or are to be secured. Then, the user snaps the inside cover 700 and outside cover 800 together and rotates the covers until the appropriate score line 840 lines up with the bottom edge of cover 700. The excess portion below the score line can then be removed from outside cover 800 using a knife and/or pliers. Then, filler 600, which preferably is made of an elastic material, is placed into the outside cover 800 with chamfer 610 pressed up against an internal chamfer 860 of outside cover 800 with an opening 620 clearing latches 830 on the outside cover 800. Then, the user trims filler 600 with a knife until it matches the end of inside cover 700, making sure that both covers are at the appropriate angle. Then, the user places the filler 600 onto one of the base members 500 aligning its ribs with those of one of the base members 500 as shown in FIG. 23.

After base members 500 have been installed on a mounting surface or wall and filler 600 has been trimmed and attached, the covers 700, 800 are ready for installation. By design the covers and base members have a same axis of rotation. This ensures that the covers will connect to the base members at the same location regardless of the orientation. The covers 700, 800 have already been joined together and trimmed as discussed above. FIG. 24 illustrates further installation steps. The covers 700, 800 slide down base members 500 simultaneously. Latches 710, 810 and 850 flex the covers 700, 800 away from the base as they are slid down the base members 500. Ribs 720 and 820 slide down on the inside of the base members' walls. This pulls down the covers 700, 800 to the base members 500. Latches 710 and 810 engage the base members by fitting into pockets 510 while latches 850 slide down so as to fit within pockets 560, acting as additional latches to help in retaining the covers 700, 800 to the base members 500. As the covers 700, 800 become fully seated, latches 730 and 830 latch onto the divider walls 585 of the base members 500.

Figure 25:
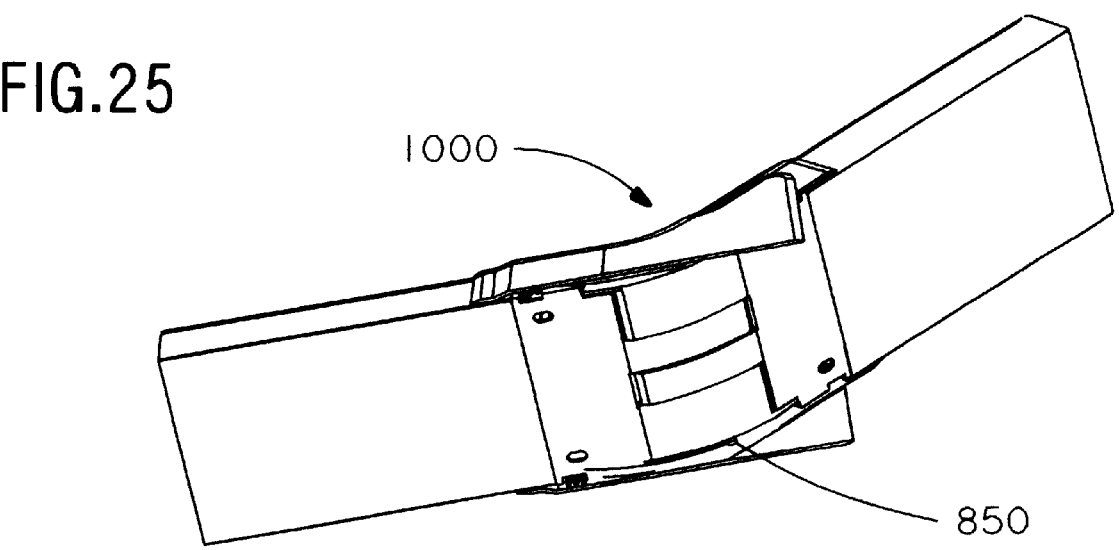
FIG. 25 shows an underside perspective view of the fully assembled adjustable inside corner fitting according to the invention.
Figure 26:
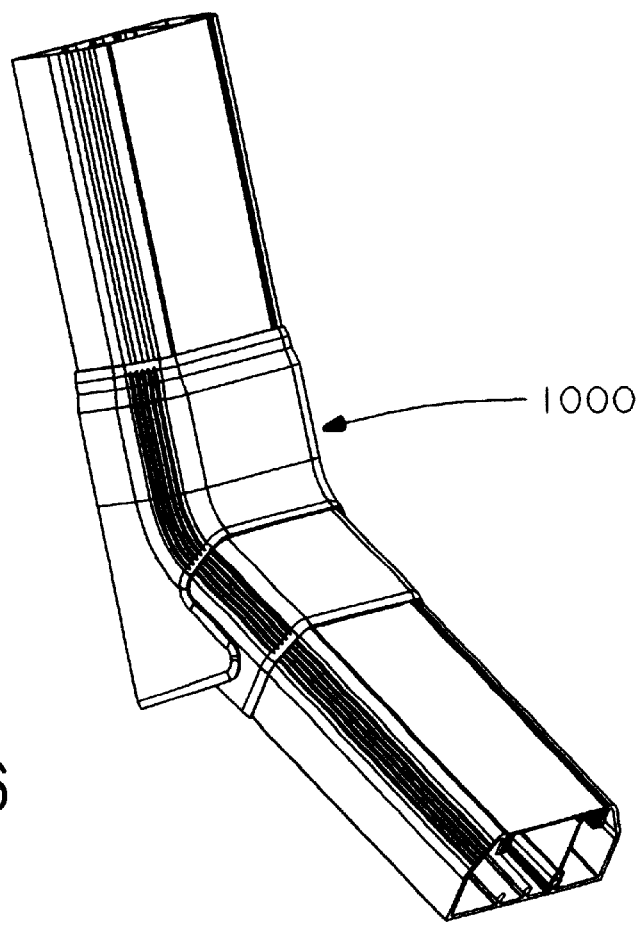
FIG. 26 shows a top side perspective view of the fully assembled adjustable inside corner fitting according to the invention.

FIG. 25 shows the underside of an assembled adjustable inside corner fitting 1000 according to a preferred embodiment of the invention with latch 850 seated underneath the base members. FIG. 26 shows a top view of the assembled inside corner fitting 1000.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. An adjustable corner fitting for a raceway duct system comprising:

first and second interconnectable arcuate base members, one of said base members having at least one arcuate slot and the other of said base members having at least one boss positionable within said at least one slot, said arcuate slot having a curvature and a length that constrains said at least one boss within said at least one slot and allows pivoting of said first base member relative to said second base member about a pivot point within a predetermined range of relative angular movement when said first and second interconnectable arcuate base members are mated;

first and second arcuate covers, one of said covers having at least one slot and the other of said covers having at least one latch positionable within said at least one slot of said one cover; and mounting structure that mounts said first and second covers to said first and second base members, wherein said first and second arcuate covers are interconnectable with each other allowing relative pivotal movement therebetween and interconnectable with said first and second arcuate base members to form an adjustable corner fitting that is matable with a raceway duct section and can be positioned at one of several angular configurations within a range of angular movement defined by said at least one slot on said at least one of said base members.

2. The adjustable corner fitting according to claim 1, wherein said corner fitting is an outside corner fitting.

3. The adjustable corner fitting according to claim 1, wherein said corner fitting is an inside corner fitting.

4. The adjustable corner fitting according to claim 1, wherein said first and second base members and said first and second covers when interconnected form at least one longitudinally extending channel for receiving cabling.

5. The adjustable corner fitting according to claim 4, wherein at least one longitudinally extending divider wall is provided on each of said first and second base members.

6. The adjustable corner fitting according to claim 5, wherein said at least one divider wall of each of said first and second base members is sized so as to overlap with and be slightly offset from said corresponding at least one divider wall of the other base member to form a plurality of longitudinally extending channels that maintain channel separation throughout the entire range of relative movement of said first and second base members.

7. The adjustable corner fitting according to claim 4, wherein said at least one channel maintains a predefined minimum bend radius throughout the range of movement of the adjustable corner fitting.

8. The adjustable corner fitting according to claim 1, wherein said first cover is fixed and said second cover is pivotable relative to said first cover.

9. The adjustable corner fitting according to claim 1, further comprising a filler operably mounted to the adjustable corner fitting to fill a gap created between said first and second covers.

10. The adjustable corner fitting according to claim 9, wherein said filler is elastic and can conform to the curvature of said base members.

11. The adjustable corner fitting according to claim 1, wherein at least one of said base members include side walls provided with ribs.

12. The adjustable corner fitting according to claim 1, a range of pivotal movement defined by said slot of said one cover is the same as that achieved by said slot of said one base member.

13. The adjustable corner fitting according to claim 1, wherein each of said first and second base members include a pocket and each of said first and second covers include a latch that attaches to said pocket to retain said first and second covers on said first and second base members.

14. The adjustable corner fitting according to claim 1, wherein said first base member includes at least one tab that rotates inside of a corresponding tab of said second base member during relative rotation of said first and second base members.

15. The adjustable corner fitting according to claim 1, wherein the first and second base members are rotatable to form an acute angle between the first and second base members.

16. The adjustable corner fitting according to claim 1, wherein the first and second base members are rotatable to form an obtuse angle between the first and second base members.

17. The adjustable corner fitting according to claim 1, wherein the first and second base members are rotatable to form a right angle between the first and second base members.

18. The adjustable corner fitting according to claim 1, wherein one of said covers includes markings indicating angle of rotation.

* * * * *